(12) United States Patent
Russell et al.

(10) Patent No.: US 8,782,562 B2
(45) Date of Patent: Jul. 15, 2014

(54) IDENTIFYING CONTENT VIA ITEMS OF A NAVIGATION SYSTEM

(75) Inventors: Deborah C. Russell, Austin, TX (US); Jonathan Cho, Austin, TX (US); Mark Ligameri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 311 days.

(21) Appl. No.: 12/868,273

(22) Filed: Aug. 25, 2010

(65) Prior Publication Data
US 2011/0131532 A1 Jun. 2, 2011

Related U.S. Application Data

(63) Continuation-in-part of application No. 12/629,228, filed on Dec. 2, 2009.

(51) Int. Cl.
*G06F 3/048* (2013.01)

(52) U.S. Cl.
USPC ............ 715/835; 715/765; 715/810; 715/838

(58) Field of Classification Search
USPC ......... 715/702, 733, 738, 764, 765, 810, 835, 715/838, 856, 863
See application file for complete search history.

(56) References Cited

U.S. PATENT DOCUMENTS

| | | | | |
|---|---|---|---|---|
| 5,838,326 A * | 11/1998 | Card et al. | | 715/775 |
| 5,880,733 A * | 3/1999 | Horvitz et al. | | 715/850 |
| 6,028,600 A * | 2/2000 | Rosin et al. | | 715/718 |
| 6,201,540 B1 * | 3/2001 | Gallup et al. | | 715/764 |
| 6,236,398 B1 * | 5/2001 | Kojima et al. | | 345/419 |
| 6,295,062 B1 * | 9/2001 | Tada et al. | | 715/835 |
| 6,466,237 B1 * | 10/2002 | Miyao et al. | | 715/838 |
| 6,621,509 B1 * | 9/2003 | Eiref et al. | | 715/836 |
| 7,055,104 B1 * | 5/2006 | Billmaier et al. | | 715/765 |
| 7,137,075 B2 * | 11/2006 | Hoshino et al. | | 715/848 |
| 7,600,192 B1 * | 10/2009 | Hashimoto et al. | | 715/802 |
| 7,610,394 B2 * | 10/2009 | Katinsky et al. | | 709/231 |
| 7,694,236 B2 | 4/2010 | Gusmorino et al. | | |
| 7,941,758 B2 * | 5/2011 | Tremblay | | 715/765 |
| 8,046,705 B2 * | 10/2011 | Hunleth et al. | | 715/765 |
| 8,276,098 B2 * | 9/2012 | Fagans et al. | | 715/811 |
| 2002/0180803 A1 * | 12/2002 | Kaplan et al. | | 345/810 |
| 2005/0278656 A1 * | 12/2005 | Goldthwaite et al. | | 715/810 |
| 2006/0212833 A1 * | 9/2006 | Gallagher et al. | | 715/848 |
| 2007/0260994 A1 | 11/2007 | Sciammarella et al. | | |
| 2008/0072168 A1 * | 3/2008 | Conway et al. | | 715/764 |
| 2008/0301555 A1 * | 12/2008 | Vartiainen et al. | | 715/704 |
| 2008/0307364 A1 * | 12/2008 | Chaudhri et al. | | 715/836 |
| 2010/0058228 A1 * | 3/2010 | Park | | 715/786 |
| 2010/0087230 A1 | 4/2010 | Peh et al. | | |
| 2010/0227686 A1 | 9/2010 | Brunet de Courssou et al. | | |
| 2010/0267449 A1 | 10/2010 | Gagner et al. | | |
| 2010/0313166 A1 * | 12/2010 | Nakayama et al. | | 715/810 |

* cited by examiner

*Primary Examiner* — Xiomar L Bautista
(74) *Attorney, Agent, or Firm* — Terrile, Cannatti, Chambers & Holland, LLP; Stephen A. Terrile

(57) ABSTRACT

A navigation system which provides: a navigation front end which provides tiles that are easily identifiable and content-driven vs. context-driven; a navigation system that includes an expanded view/tile paradigm; and a navigation system that allows users to interact with the native operating system environment of the information handling system.

18 Claims, 14 Drawing Sheets

IDENTIFYING CONTENT VIA ITEMS OF A NAVIGATION SYSTEM

CROSS REFERENCE TO RELATED APPLICATIONS

This application is a continuation-in-part of co-pending application Ser. No. 12/629,228, filed Dec. 2, 2009, which is incorporated herein by reference in its entirety.

BACKGROUND OF THE INVENTION

1. Field of the Invention

The present invention relates to information handling systems and more particularly to identifying content via items of a navigation system for use with information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One issue relating to information handling systems is navigation across the various items installed or accessed via the information handing systems. Many information handling system manufacturers install third-party applications which may not be familiar to the end user. For example, a user may desire to edit photographs via the information handling system but may not be familiar with how to access these capabilities (e.g., via a Photoshop type application or a Windows Picture Viewer application, both of which provide editing capabilities).

Another issue relating to information handling systems is that software developers and computer companies often focus on delivering software as a function of brand name in which the end user launches a particular application or tool. An issue relating to this approach is that customers are not always familiar with an application name due to branding and/or contextually inappropriate application names. If a user launches a parent application, features neither may nor may not be easily accessible or discoverable.

It is known to provide an information handling system with a preinstalled navigation program (often referred to as a launching program or a dock application). Certain of these navigation programs can require a user to exit the operating system environment (e.g., Windows operating system environment). Examples of known navigation programs includes the Apple Dock application, which launches a parent application from the desktop; the iPhone/iPod Touch application, which allows a user to select a tile which launches a parent application, the Dell Dock application, which launches a parent application from the desktop, the Dell TouchZone application, which launches a parent application from the desktop, the Hewlett Packard TouchSmart Center application, which launches a parent application in a separate Windows environment; and, the Advanced Micro Devices Fusion Media Explorer (FME) application, which launches a parent application in a separate Windows environment. With many of these applications, when the user is within the parent application, the user can then access content. E.g., the parent application may be a web browser application and the content may be a particular website that is accessed via the web browser.

Accordingly, it is desirable to provide a navigation system which provides tiles that are easily identifiable and content-driven vs. context-driven. Also, it is desirable to provide a navigation system that includes an expanded view/tile paradigm. Also, it is desirable to provide a navigation system that allows users to interact with the native operating system environment of the information handling system.

SUMMARY OF THE INVENTION

In accordance with the present invention, a navigation system is provided which provides: a navigation system which provides tiles that are easily identifiable and content-driven vs. context-driven; a navigation system that includes an expanded view/tile paradigm; and a navigation system that allows users to interact with the native operating system environment of the information handling system.

More specifically, the navigation system provides expanded tiles functionality which offers a context driven dynamic interface in which users can directly access the contents of their applications. With this expanded tile functionality, users can view several recent pieces of content in one viewing. For example, content that is specific to music may be a single song, album, playlist, purchased music, and/or radio station. Similar experiences are provides with expanded tiles for other content such as photo, video, web, social networking, and games. The navigation system also provides a dynamic and light interface via expanded tiles that enhances interface interaction and discoverability, delights the user with a tangible user interface, and offers a personalized user experience. The navigation system also provides users with the ability to personalize their interface with their own content. Also, the navigation system allows information handling systems to be configured during factory install to targeted demographics, such as for example, family, teens, social networking users, and gamers, to name a few.

More specifically, in one embodiment, the invention relates to a method for facilitating navigation within an information handling system. The method includes presenting, via the information handling system, a navigation front end, the navigation front end comprising a plurality of tiles, each of the plurality of tiles corresponding to a respective item, the plurality of tiles providing a context driven dynamic interface to allow a user to directly access the item, the plurality of tiles being dynamically modifiable by the navigation front end; enabling access to the item by actuation of one of the plurality of tiles; and, presenting an expanded tile representation upon access to the item, the expanded tile representation allowing a user to interact with a rich visual context menu and to access most recent accessed content relating to the item.

In another embodiment, the invention relates to an apparatus for facilitating navigation within an information handling system. The apparatus includes means for presenting, via the information handling system, a navigation front end, the navigation front end comprising a plurality of tiles, each of the plurality of tiles corresponding to a respective item, the plurality of tiles providing a context driven dynamic interface to allow a user to directly access the item, the plurality of tiles being dynamically modifiable by the navigation front end; means for enabling access to the item by actuation of one of the plurality of tiles; and, means for presenting an expanded tile representation upon access to the item, the expanded tile representation allowing a user to interact with a rich visual context menu and to access most recent accessed content relating to the item.

In another embodiment, the invention relates to an information handling system. The information handling system includes a processor; and memory coupled to the processor. The memory stores a system for facilitating navigation within an information handling system. The system includes instructions executable by the processor for: presenting, via the information handling system, a navigation front end, the navigation front end comprising a plurality of tiles, each of the plurality of tiles corresponding to a respective item, the plurality of tiles providing a context driven dynamic interface to allow a user to directly access the item, the plurality of tiles being dynamically modifiable by the navigation front end; enabling access to the item by actuation of one of the plurality of tiles; and, presenting an expanded tile representation upon access to the item, the expanded tile representation allowing a user to interact with a rich visual context menu and to access most recent accessed content relating to the item.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
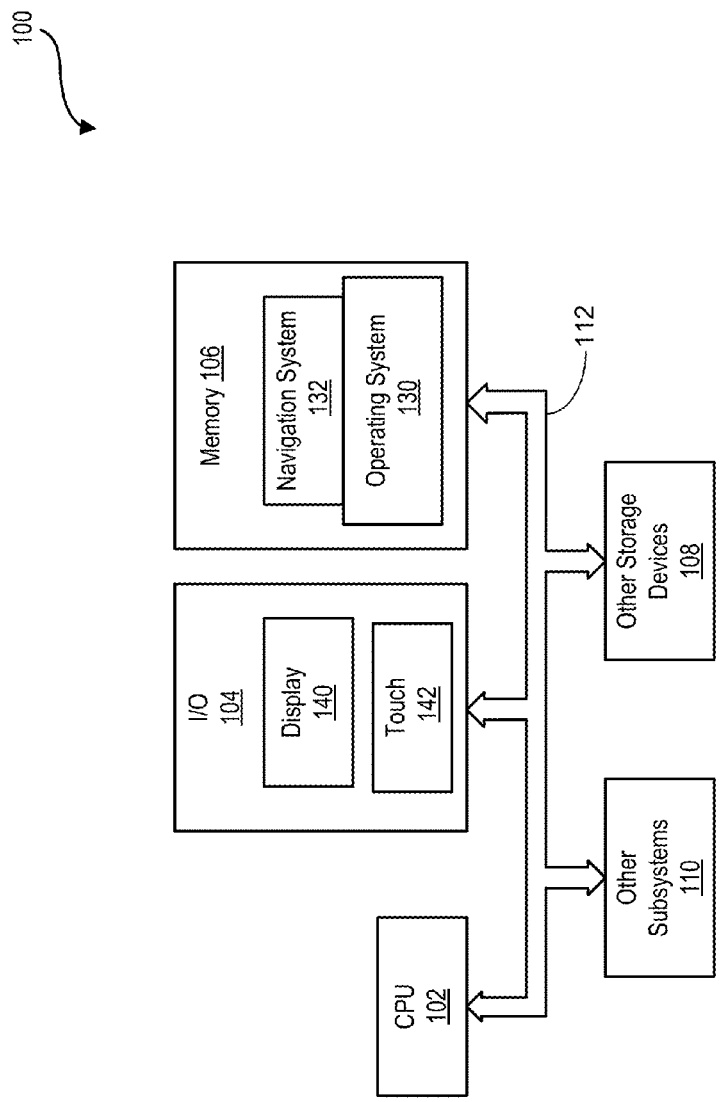
FIG. 1 shows a system block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, a remote control and associated controllers (each of which may be coupled remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112.

The information handling system further includes an operating system 130 and a navigation system 132 which is tightly coupled with the operating system 130. The operating system 130 and the navigation system 132 are stored on the memory 106 and executable by the processor 102.

The navigation system 132 provides expanded tiles functionality which offers a context driven dynamic interface in which users can directly access the contents of their applications. With this expanded tile functionality, users can view several recent pieces of content in one viewing. For example, content that is specific to music may be a single song, album, playlist, purchased music, and radio station. Similar experiences are provides with expanded tiles for other content such as photo, video, web, social networking, and games. The navigation system also provides a dynamic and light interface via expanded tiles that enhances interface interaction and discoverability, delights the user with a tangible user interface, and offers a personalized user experience. The navigation system also provides users with the ability to personalize their interface with their own content. Also, the navigation system allows information handling systems to be configured during factory install to targeted demographics, such as for example, family, teens, social networking users, and gamers, to name a few.

The navigation system 132 provides a user interface, in which users can interact (e.g., via expanded tiles) and focus on their content with application name/branding designed as a secondary entry point. More specifically, users can interact with their content (including both local content and content that is remote, e.g., content that is stored in the cloud) via the navigation system without necessarily launching a parent application.

The I/O devices 104 can include a display 140 as well as a touch input device 142. The touch input device 142 may be integrated into the display such that the display is a touch sensitive display device.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
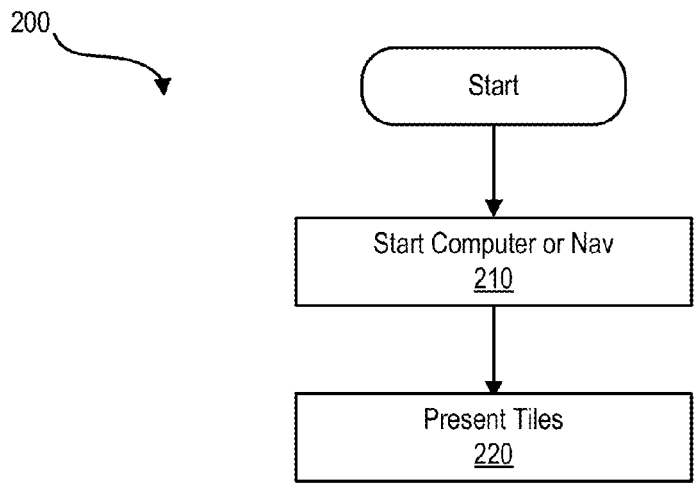
FIG. 2 shows a flow chart of the initial access to the navigation system.

Referring to FIG. 2, a flow chart of the initial access 200 to the navigation system 132 is shown. More specifically, the information handling system 100 is started (e.g., by power up, returning from hibernation, etc.) which starting automatically launches the navigation system or the navigation system is started (e.g., by actuating a navigation icon) at step 210, the navigation system is instantiated. In certain embodiments, the information handling system 100 is configured such that when the information handling system 100 is started, the navigation system 132 is automatically instantiated. When the navigation system 132 executes, the navigation system presents expanded tiles at step 220.

The navigation system 132 includes a gadget (e.g., which is composed of a dynamic collection of tiles, icons, images) that enables quick and easy access to content. The navigation system 132 its components (e.g., expanded tiles) are designed to support various input devices, including touch, mouse, keyboard, touchpad, and remote control. Where appropriate, the navigation system 132 provides a user experience specific to that mode of input.

Figure 3:
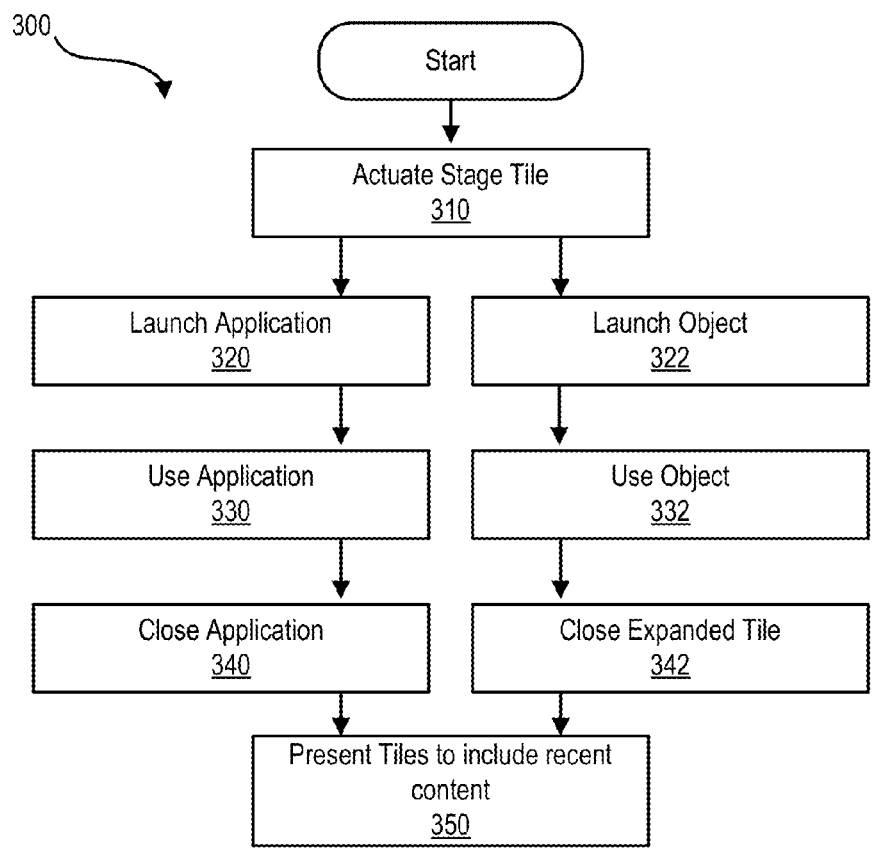
FIG. 3 shows a flow chart of the operation of a navigation system.

Referring to FIG. 3, a flow chart of the operation 300 of the navigation system 132 is shown. More specifically, the navigation system starts by actuating a navigation system tile at step 310. Depending on the type of tile that is actuated, the navigation system 132 launches an application at step 320 (for the case where the tile is associated with an application) or launches an object (for the case where the tile is associated with an object) at step 322. For a launched application, the user can then use the application as desired at step 330. For a launched object, the user can then use the object as desired at step 332. After completing use of the application, the user closes the application at step 340. After completing user of the object, the user closes the object at step 342. The navigation system then revises the presentation of the tiles to reflect any recently used or accessed content at step 350. In certain embodiments, the tiles of the navigation system cycle through the content that is included within a respective expanded view.

Figure 4:
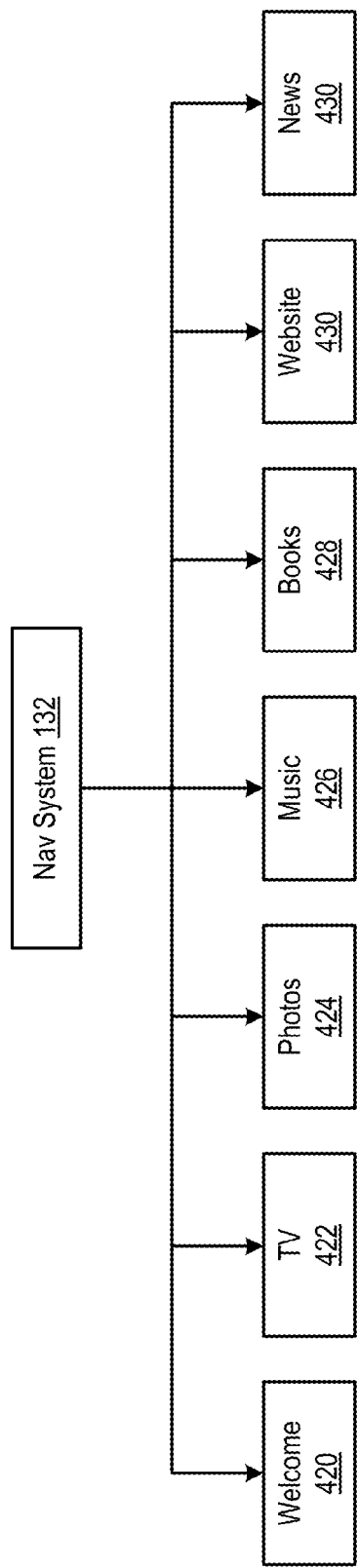
FIG. 4 shows a block diagram of a navigation system.

Referring to FIG. 4, a block diagram of a navigation system is shown. More specifically, the navigation system 132 enables quick and easy access to a dynamic collection of a plurality of items (e.g., tiles, icons and images). The items provide quick and easy access to content which is linked to the respective items. In certain embodiments, the navigation system 132 includes one or more of the following a welcome item 420, a television item 422, a photo item 424, a music item 426, a book item 428, a website item 430 and a new item 430. There also may be more then one of certain items. For example, there may be a plurality of specific web site items for direct and easy access to certain websites. Other items are also contemplated. For example, the items can further include a games item, an applications item, etc. The navigation system 132 is designed to support various input devices, including touch, mouse, keyboard, touchpad and remote control. Where appropriate, the navigation system 132 provides a user experience that is specific to the mode of input. Also, the navigation system is designed to be scalable such that the navigation system functions appropriately for different information handing system platforms, different screen sizes, and different operating systems. E.g., the navigation system 132 may have certain features disabled for a lower powered information handling system platform. Also, e.g., the navigation system may present fewer items for a smaller screen size.

Figure 5A:
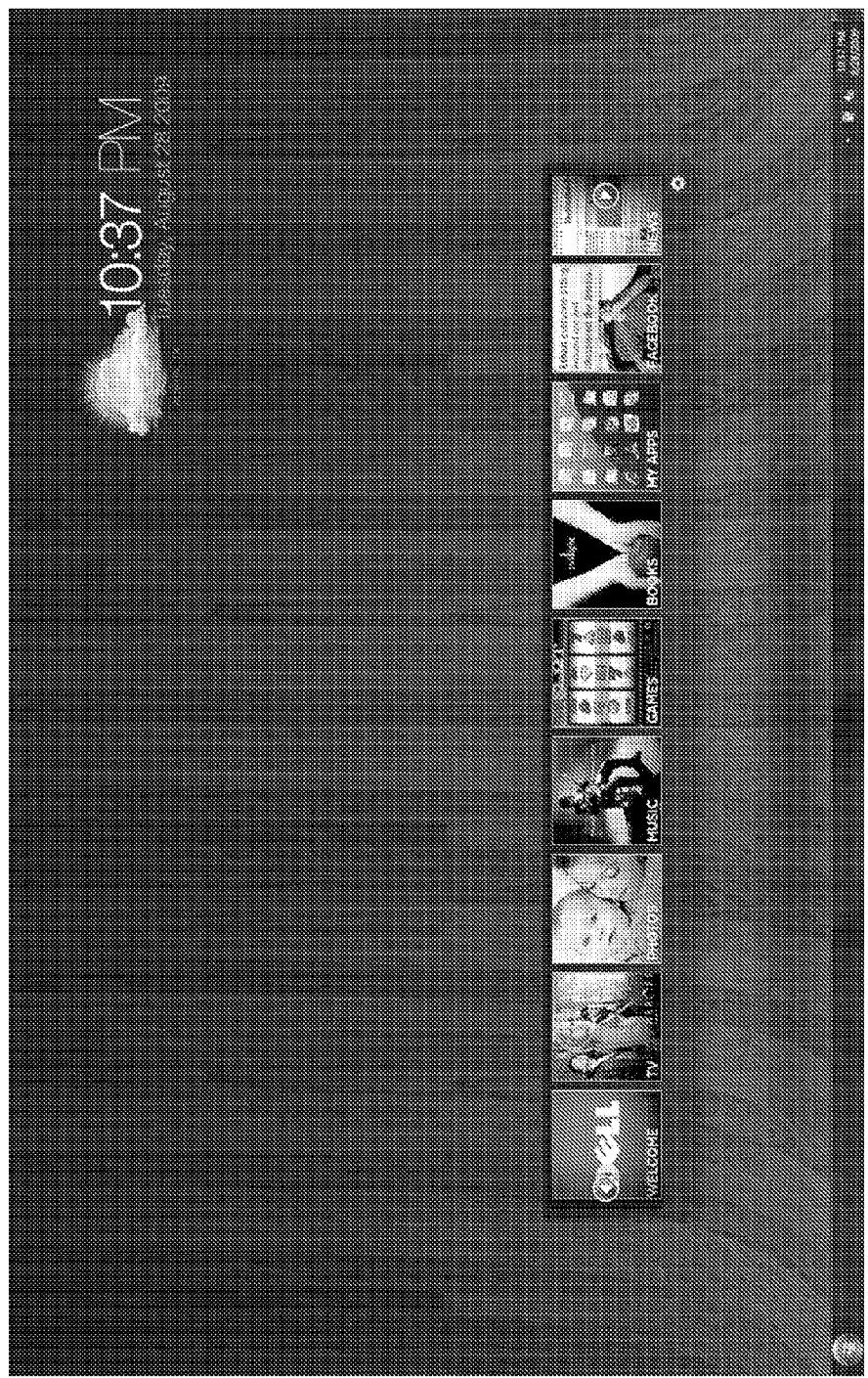
FIGS. 5A, 5B and 5C show example screen presentations of a navigation system.
Figure 5B:
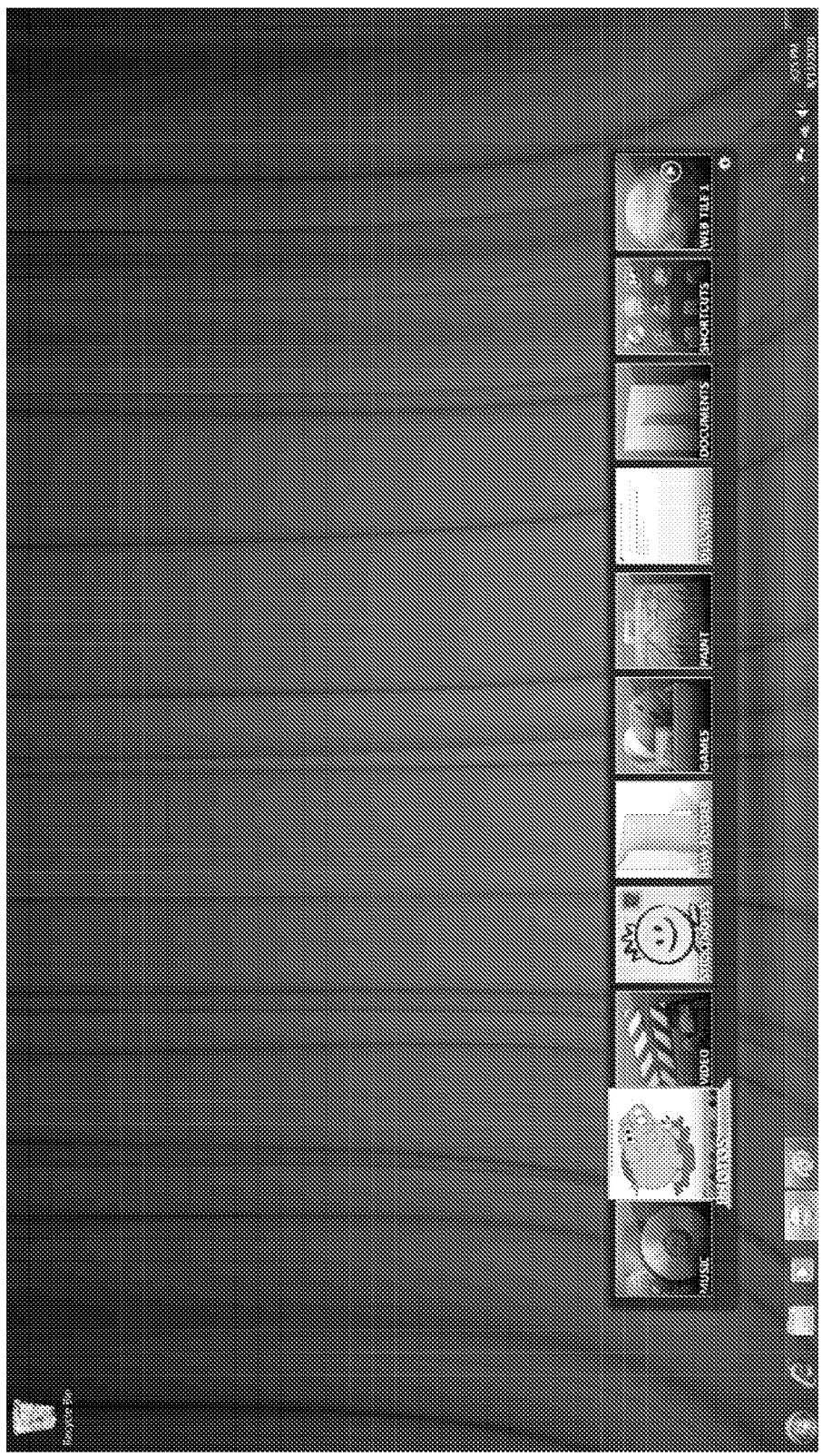
Figure 5C:

Referring to FIGS. 5A, 5B, and 5C, example screen presentations of a navigation system is shown. More specifically, the navigation system presents a navigation front end (e.g., a gadget) which includes a plurality of tiles. The tiles are presented so as to simulate a three dimensional floating area upon which the tiles are located. This three dimensional context is further accented by providing the screen presentation with a background image that simulates a stage which is then curved (e.g., via a presentation of a floor or of a curtain). In certain embodiments, this representation further includes a representation of boards that simulate a stage, thus providing the user with the illusion that the tiles are on the stage. Also, in certain embodiments, the presentation can be configured to scroll so that more items can be included within the gadget than can be seen on the desktop at any given time.

Also, when a user hovers over a particular tile, then that tile is accented to draw attention to that item. E.g. FIG. 5B shows a screen presentation where the Photo tile accented. This accenting can include moving the item forward as well as expanding the size of the tile relative to the other displayed tiles on the navigation front end. This accenting can also include presenting the description of the tile as a three dimensional presentation. This accenting can also include presenting a simulation of a horizontal surface on which the description rests.

Also, when a user actuates a particular tile, then an expanded view of that tile is presented. E.g., FIG. 5C shows a screen presentation where an expanded view of the sticky note item is presented due to the sticky note tile being actuated.

Figure 6:
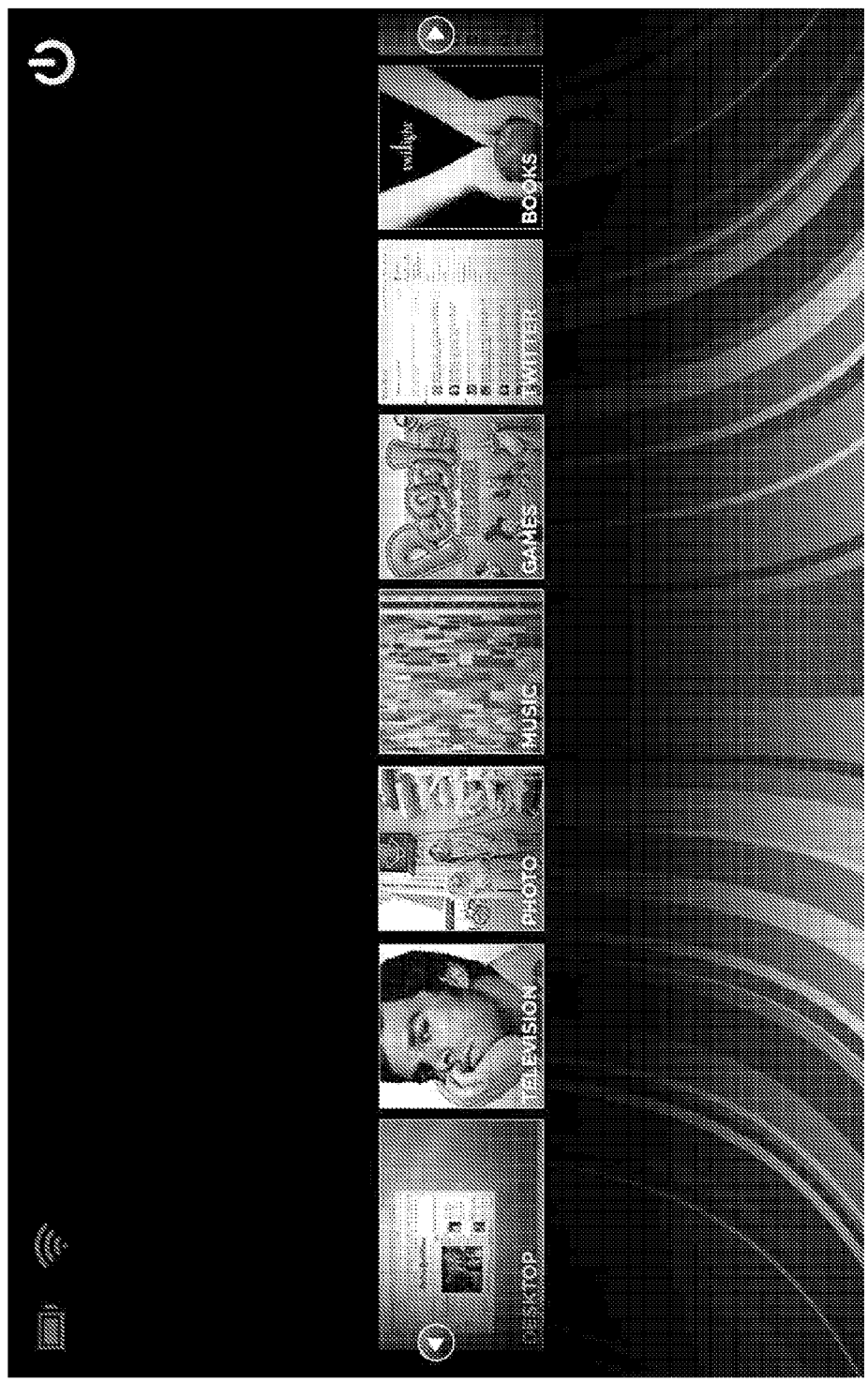
FIG. 6 shows an example screen presentation of a full screen version of a navigation system.

FIG. 6 shows an example screen presentation of a full screen version of a navigation system. More specifically, the navigation system can also present a front end which is optimized for use with a full screen environment such as may be used by a hand held device, a pad type of portable device or a consumer electronics device (including a television or projection device). The full screen version of the navigation system includes the three dimensional context as well as the background image to provide continuity of context across various platforms. The full screen version of the navigation system also hides the desktop of the native operating system of the information handling system. Also, in certain embodiments, the full screen version of the navigation system presents as one of the items of the gadget a screen grab of whatever screen presentation was present when the navigation system entered into the full screen mode of operation (e.g., the desktop item). In this way, a user can easily navigate, via a navigation item, back to the immediately preceding state of the information handling system.

Figure 7:
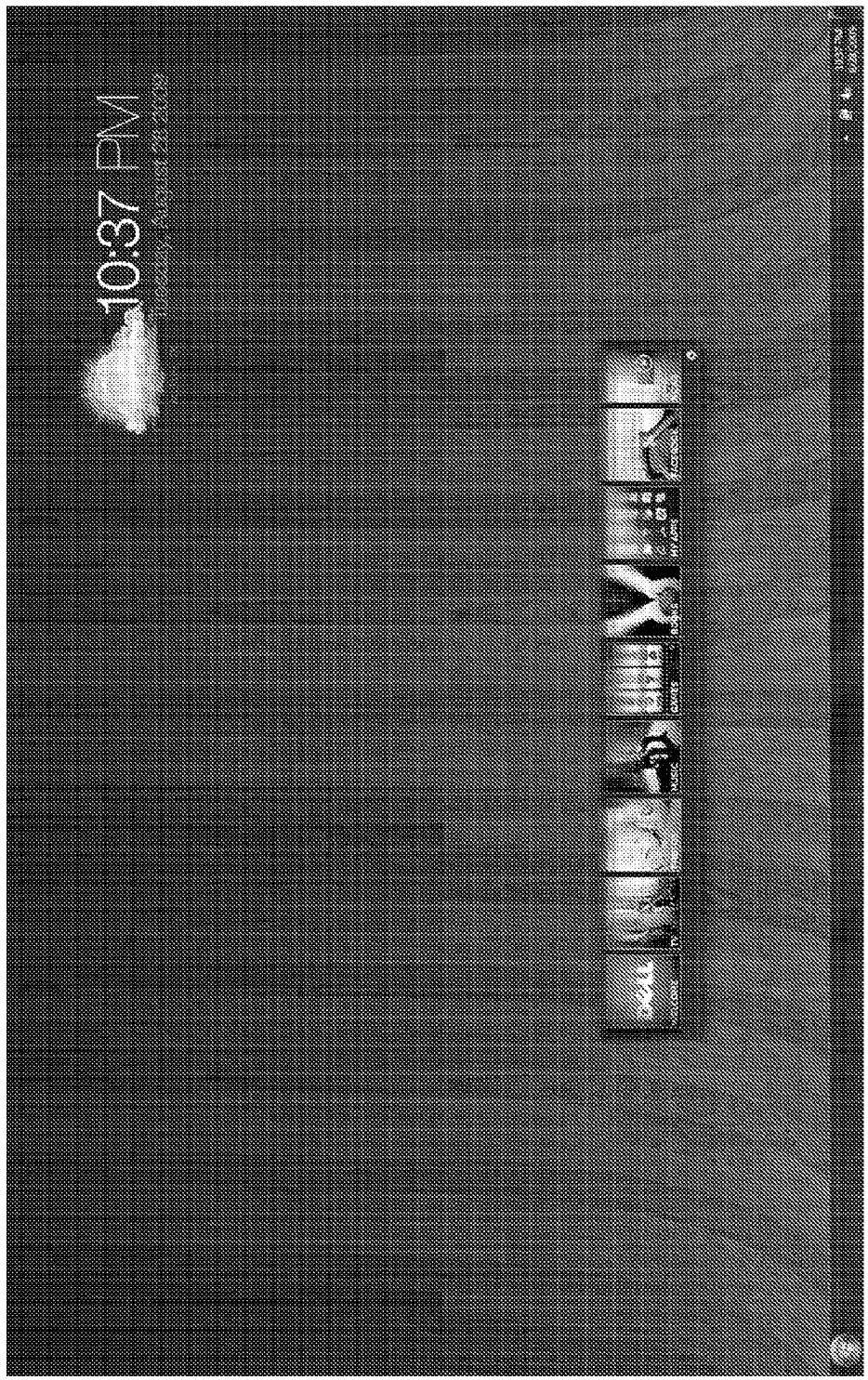
FIG. 7 shows an example screen presentation of a dynamic minimize function of a navigation system.
Figure 8:
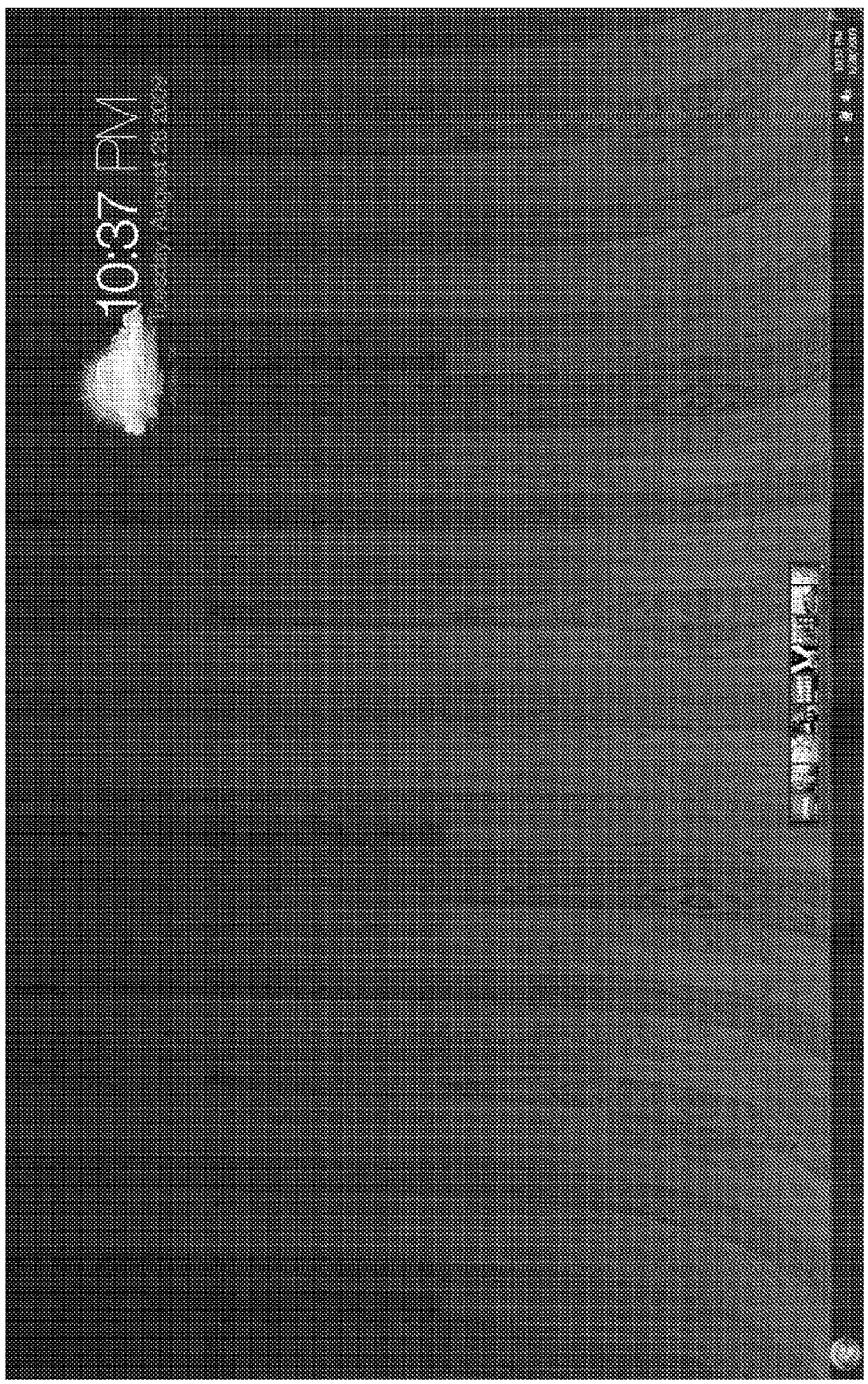
FIG. 8 shows another example screen presentation of a dynamic minimize function of a navigation system.

FIGS. 7 and 8 show example screen presentations of a dynamic minimize function of a navigation system. More specifically, the dynamic minimize function is actuated by a finger or mouse action of dragging the navigation system presentation in the direction of the task bar. The navigation system minimizes to a presentation that is included on the on the desktop screen presentation. Thus, users can minimize the navigation system and/or access content that may be blocked by the navigation system presentation. In certain embodiments, a single tap or click on the minimized view of the navigation system restores the full size navigation system presentation. The minimized view of the navigation system is a static representation (i.e., no matter where a user taps or clicks, the full size navigation system presentation is restored as opposed to opening an expanded view upon actuation of a tile.

Figure 9:
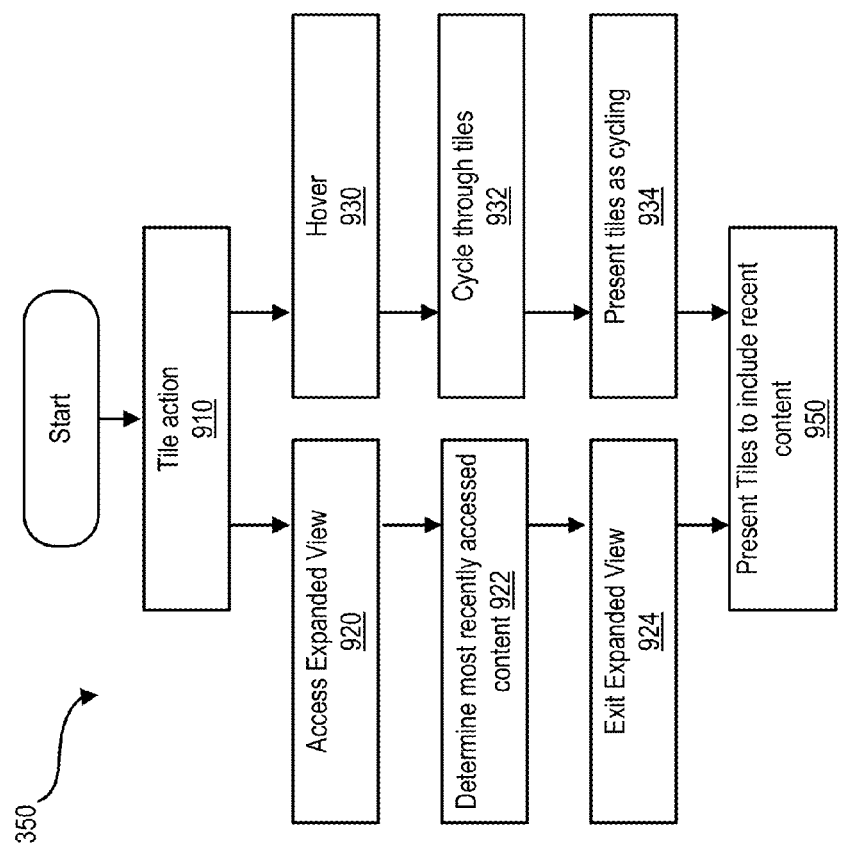
FIG. 9 shows a flow chart of the operation of a tile presentation portion of a navigation system.

FIG. 9 shows a flow chart of the operation of a tile presentation portion 350 of a navigation system. In generally, the tiles presented via the navigation system 132 include dynamic content that allow generic tiles to be replaced by user content (e.g., sticky notes, photo icons and music icons). For example, if a user launches a favorite band in a music application via the music tile, the tile from the navigation system is automatically populated with album art or a picture of the band. The next time the user visits the desktop which includes the navigation system, the music tile is replaced by an image of the band or artist. Also for example, the tiles can access document folders. If a tile access a document folder, then the tile can be dynamically populated with a last object that was accessed or viewed within the folder (e.g., a word processing document or file name).

More specifically, during operation of a tile presentation portion 350, the navigation system starts operation by determining a tile action at step 910. For example, a tile action can include a hover action 920 (see e.g., FIG. 5B) as well as actuating a tile to access an expanded view 922 (see e.g., FIG. 5C).

When a hover action is performed 930, the navigation system accesses the content contained within the tile on which the hover action is being performed and cycles through the tiles contained within the expanded view at step 932. Next, the navigation system presents the tiles that are contained within the respective expanded view in a cycling manner at step 934. So for example, if the photo tile is the tile upon which the hover action is being performed, then the navigation system 132 cycles through the tiles contained within the photo expanded view. The navigation system also presents other tiles to show their respective most recently accessed content 950.

When a tile is actuated then the navigation system monitors the expanded view to determine which content is access at step 922. When the navigation system exits the navigation expanded view at step 924, the navigation system updates the tile presentation to show the most recently accessed content at step 950.

Figure 10:
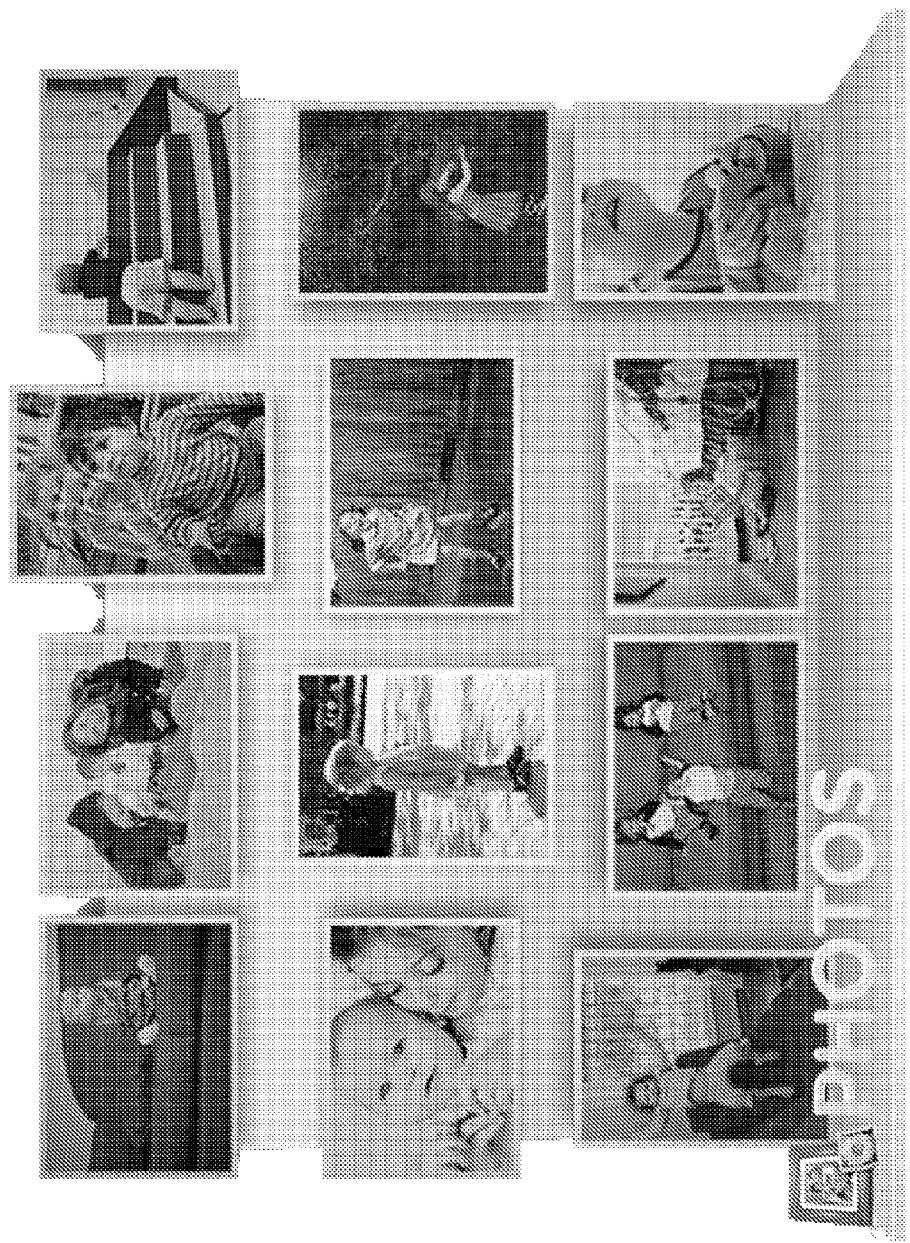
FIG. 10 shows an example screen presentation of an expanded view of a photo portion of a navigation system.
Figure 11:
FIG. 11 shows an example screen presentation of an expanded view of a music portion of a navigation system.
Figure 12:
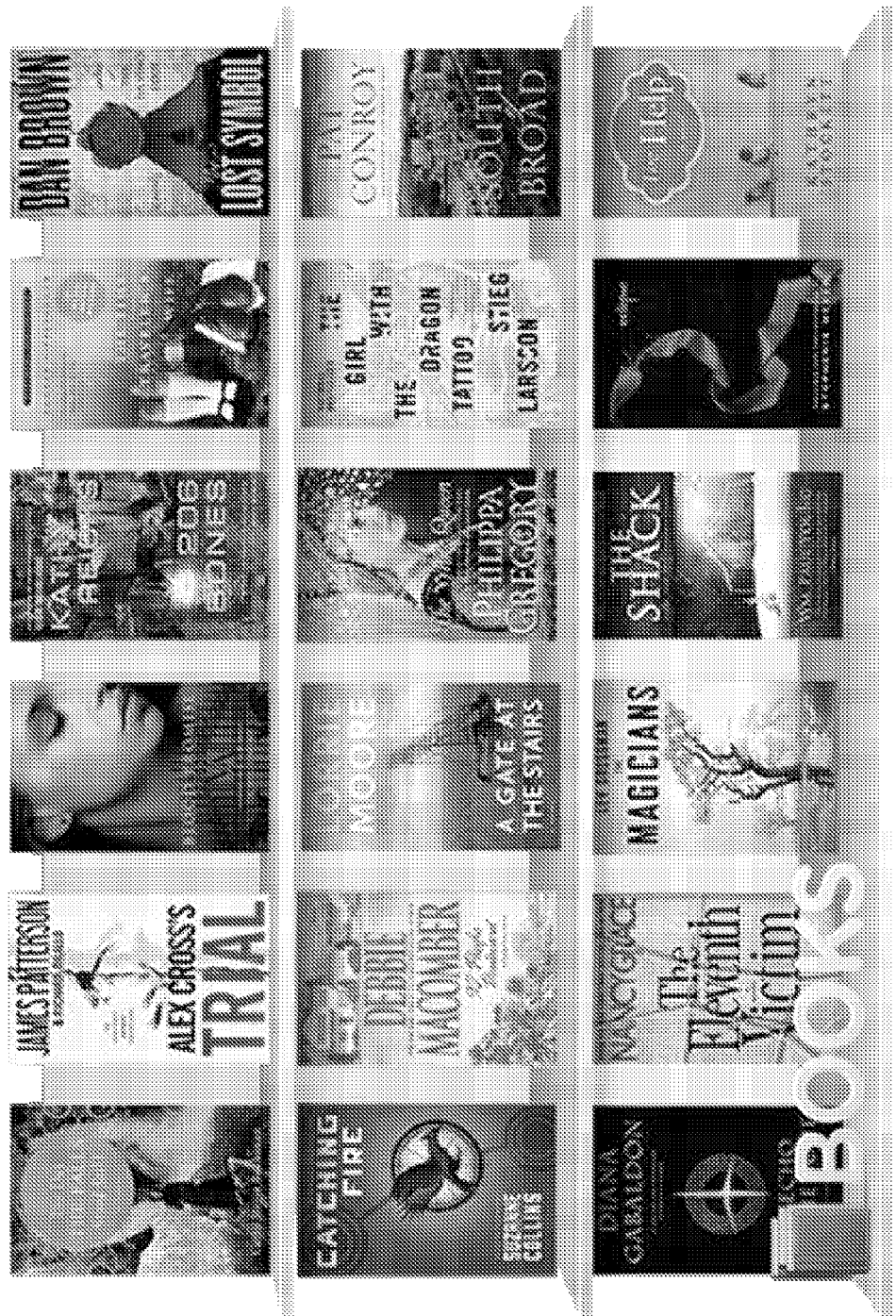
FIG. 12 shows an example screen presentation of an expanded view of a book portion of a navigation system.
Figure 13:
FIG. 13 shows an example screen presentation of an expanded view of a website portion of a navigation system.

FIGS. 10-13 show examples of expanded tiles that are accessed by actuating an item on the navigation system front end. More specifically, FIG. 10 shows an example screen presentation of an expanded view of a photo portion of a navigation system. FIG. 11 shows an example screen presentation of an expanded view of a music portion of a navigation system. FIG. 12 shows an example screen presentation of an expanded view of a book portion of a navigation system. FIG. 13 shows an example screen presentation of an expanded view of a website portion of a navigation system.

The expanded tiles of the navigation system 132 provide the navigation system with a middle ground between icon thumbnails and fully open parent applications. Thus, the expanded tiles allow a user to use an application without launching a full version of the application. In other words, users can interact with a rich visual context menu to and access most recent content directly or launch the application which corresponds to the tile.

An expanded tile communicates with the navigation system via a navigation system application program interface (API) that allow a respective application to be coupled with the navigation system 132 as well as communicate directly with the associated application.

For example, the expanded music tile (see e.g., FIG. 11) in the navigation system 132 allows users to view and control (play/pause) the "top 10" music albums without launching the full music application. Also, in certain embodiments, if the user plays an album from the middle of the expanded tile grid, the current screen presentation of the album is moved to top of the expanded tile grid.

Also, the expanded tile allows users to launch the parent application by for example actuating an icon that is included within the expanded view. For example, a user could launch a music application via the expanded music tile. Then the user then listens to particular content, the expanded tile then auto-populates the grid with a screen presentation of the recently accessed content. Also, the next time the user accesses the desktop, the music tile icon within the navigation system front end is replaced by an image of the band or artist. Also, in certain embodiments, the tile presented on the front end will cycle through the most recent content that is housed in the expanded tile. Also, in certain embodiments, the tile presented on the front end will cycle through content if the tile is not in focus. In other words, the user does not have to select a tile to animate content.

Also, in certain embodiments, an expanded view layout can be configured such that a user can view images, grids, views, etc, of their own content.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for facilitating navigation within an information handling system comprising:
    presenting, via the information handling system, a navigation front end, the navigation front end comprising a plurality of tiles, each of the plurality of tiles corresponding to a respective item, the plurality of tiles providing a context driven dynamic interface to allow a user to directly access the item, the plurality of tiles being dynamically modifiable by the navigation front end, the plurality of tiles being presented so as to simulate floating above a background thus providing an impression of three dimensionality;

accenting a particular tile of the plurality of tiles when the user hovers over the particular tile, the accenting comprising moving the particular tile forward and expanding a size of the tile relative to other tiles of the plurality of tiles, the accenting further comprising presenting a description of the particular tile as a three dimensional presentation, the accenting further comprising presenting a simulation of a horizontal surface and presenting the description so as to appear to be resting on the horizontal surface;

enabling access to the item by actuation of one of the plurality of tiles; and, presenting an expanded tile representation upon access to the item, the expanded tile representation allowing a user to interact with a rich visual context menu and to access most recent accessed content relating to the item; and wherein while accenting the particular tile at least some of the plurality of tiles continue to be presented and accessible so as to allow another tile to be accessed.

2. The method of claim 1 wherein:
a tile is dynamically modified to represent content accessed by the user via the expanded tile representation.

3. The method of claim 2 wherein:
a tile is dynamically modified to represent most recently accessed content accessed by the user via the expanded tile representation.

4. The method of claim 1 wherein:
a plurality of tile actions may be performed by a user on each of the plurality of tiles.

5. The method of claim 4 wherein:
the plurality of tile actions comprises a hover action, the hover action causing the accenting.

6. The method of claim 4 wherein:
upon performance of the hover action, the particular tile being accented is dynamically modified to provide a cyclic representation of content stored within the expanded tile corresponding to the particular tile.

7. An apparatus for facilitating navigation within an information handling system comprising:
means for presenting, via the information handling system, a navigation front end, the navigation front end comprising a plurality of tiles, each of the plurality of tiles corresponding to a respective item, the plurality of tiles providing a context driven dynamic interface to allow a user to directly access the item, the plurality of tiles being dynamically modifiable by the navigation front end, the plurality of tiles being presented so as to simulate floating above a background thus providing an impression of three dimensionality;

means for accenting a particular tile of the plurality of tiles when the user hovers over the particular tile, the accenting comprising moving the particular tile forward and expanding a size of the tile relative to other tiles of the plurality of tiles, the accenting further comprising presenting a description of the particular tile as a three dimensional presentation, the accenting further comprising presenting a simulation of a horizontal surface and presenting the description so as to appear to be resting on the horizontal surface;

means for enabling access to the item by actuation of one of the plurality of tiles; and, means for presenting an expanded tile representation upon access to the item, the expanded tile representation allowing a user to interact with a rich visual context menu and to access most recent accessed content relating to the item; and wherein while accenting the particular tile at least some of the plurality of tiles continue to be presented and accessible so as to allow another tile to be accessed.

8. The apparatus of claim 7 wherein:
a tile is dynamically modified to represent content accessed by the user via the expanded tile representation.

9. The apparatus of claim 8 wherein:
a tile is dynamically modified to represent most recently accessed content accessed by the user via the expanded tile representation.

10. The apparatus of claim 7 wherein:
a plurality of tile actions may be performed by a user on each of the plurality of tiles.

11. The apparatus of claim 10 wherein:
the plurality of tile actions comprises a hover action, the hover action causing the accenting.

12. The apparatus of claim 10 wherein:
upon performance of the hover action, the particular tile being accented is dynamically modified to provide a cyclic representation of content stored within the expanded tile corresponding to the particular tile.

13. An information handling system comprising:
a processor;
memory coupled to the processor, the memory storing a system for facilitating navigation within an information handling system, the system comprising instructions executable by the processor for:
presenting, via the information handling system, a navigation front end, the navigation front end comprising a plurality of tiles, each of the plurality of tiles corresponding to a respective item, the plurality of tiles providing a context driven dynamic interface to allow a user to directly access the item, the plurality of tiles being dynamically modifiable by the navigation front end, the plurality of tiles being presented so as to simulate floating above a background thus providing an impression of three dimensionality;

accenting a particular tile of the plurality of tiles when the user hovers over the particular tile, the accenting comprising moving the particular tile forward and expanding a size of the tile relative to other tiles of the plurality of tiles, the accenting further comprising presenting a description of the particular tile as a three dimensional presentation, the accenting further comprising presenting a simulation of a horizontal surface and presenting the description so as to appear to be resting on the horizontal surface;

enabling access to the item by actuation of one of the plurality of tiles; and, presenting an expanded tile representation upon access to the item, the expanded tile representation allowing a user to interact with a rich visual context menu and to access most recent accessed content relating to the item; and wherein while accenting the particular tile at least some of the plurality of tiles continue to be presented and accessible so as to allow another tile to be accessed.

14. The information handling system of claim 13 wherein:
a tile is dynamically modified to represent content accessed by the user via the expanded tile representation.

15. The information handling system of claim 14 wherein:
a tile is dynamically modified to represent most recently accessed content accessed by the user via the expanded tile representation.

16. The information handling system of claim 13 wherein:
a plurality of tile actions may be performed by a user on each of the plurality of tiles.

17. The information handling system of claim 16 wherein:
the plurality of tile actions comprises a hover action, the hover action causing the accenting.

18. The information handling system of claim 16 wherein:
upon performance of the hover action, the particular tile being accented is dynamically modified to provide a cyclic representation of content stored within the expanded tile corresponding to the particular tile.

\* \* \* \* \*